(12) United States Patent
Rowe (10) Patent No.: US 11,469,690 B2
(45) Date of Patent: Oct. 11, 2022

(54) ELECTRODE PAIRS HAVING SAW-TOOTH CONFIGURATION AND ARTIFICIAL MUSCLES INCLUDING SAME

(71) Applicant: Toyota Motor Engineering & Manufacturing North America, Inc., Plano, TX (US)

(72) Inventor: Michael P. Rowe, Pinckney, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 85 days.

(21) Appl. No.: 17/168,360

(22) Filed: Feb. 5, 2021

(65) Prior Publication Data
US 2022/0166351 A1    May 26, 2022

Related U.S. Application Data (60) Provisional application No. 63/117,490, filed on Nov. 24, 2020.

(51) Int. Cl.
*H02N 11/00*    (2006.01)
*B25J 9/12*     (2006.01)

(52) U.S. Cl.
CPC .............. *H02N 11/006* (2013.01); *B25J 9/12* (2013.01); *H02N 11/00* (2013.01)

(58) Field of Classification Search
CPC ......... H02N 11/00; H02N 11/006; B25J 9/12; A61B 2018/1465; A61N 1/18; A61N 1/36003; A61N 1/3603

(Continued)

(56) References Cited

U.S. PATENT DOCUMENTS 6,376,989 B1 *  4/2002  Vollkommer ....... H01J 61/0672
                                                   315/246
7,586,242 B2    9/2009  Yokoyama et al.
(Continued)

FOREIGN PATENT DOCUMENTS

JP      5261730 B2    8/2013
KR    101779692 B1    9/2017

OTHER PUBLICATIONS

E. Acome, et al., "Hydraulically Amplified Self-Healing Electrostatic Actuators With Muscle-Like Performance," Science Journal, Jan. 5, 2018: vol. 359, Issue 6371, pp. 61-65, Department of Mechanical Engineering & Materials Science and Engineering Program, University of Colorado, Boulder, CO 80309, USA.

*Primary Examiner* — Burton S Mullins
(74) *Attorney, Agent, or Firm* — Dinsmore & Shohl LLP (57) ABSTRACT

An electrode pair is provided including a first electrode and a second electrode. Each of the first electrode and the second electrode have an outer surface, an inner surface, a first end, a second end, and a lead extending outwardly from the first end. The lead has a first width at the first end. The second end of at least one of the first electrode and the second electrode have a recess formed therein having a first terminus and a second terminus. A second width extends between the first terminus and the second terminus of the recess. The recess is defined by a saw-tooth pattern. When the first electrode is positioned on the second electrode, the recess of the at least one of the first electrode is adjacent the lead of the other electrode.

20 Claims, 7 Drawing Sheets

(58) Field of Classification Search
USPC .......................................................... 623/24
See application file for complete search history.

(56) References Cited

U.S. PATENT DOCUMENTS

| | | | |
|---|---|---|---|
| 7,679,268 | B2 | 3/2010 | Yokoyama et al. |
| 8,237,324 | B2* | 8/2012 | Pei ........................... F03G 7/005 |
| | | | 310/306 |
| 8,508,109 | B2 | 8/2013 | Pelrine et al. |
| 9,705,065 | B2* | 7/2017 | Lee ..................... H01L 41/0973 |
| 10,233,910 | B2* | 3/2019 | Mazzeo ................... B25J 9/142 |
| 10,302,586 | B2* | 5/2019 | Sun ....................... G01N 27/305 |
| 10,411,617 | B2 | 9/2019 | Chiba et al. |
| 10,743,410 | B2* | 8/2020 | Osawa ................... G06F 3/0445 |
| 2009/0085444 | A1* | 4/2009 | Alvarez Icaza Rivera ................... |
| | | | H02N 11/006 |
| | | | 310/365 |
| 2009/0115285 | A1* | 5/2009 | Najafi ....................... F15B 7/00 |
| | | | 29/25.35 |
| 2009/0310221 | A1 | 12/2009 | Aschwanden |
| 2012/0279762 | A1* | 11/2012 | Hur ........................ B82Y 40/00 |
| | | | 977/932 |
| 2018/0338866 | A1* | 11/2018 | Kharazmi ......... A61F 13/00063 |

\* cited by examiner

ELECTRODE PAIRS HAVING SAW-TOOTH CONFIGURATION AND ARTIFICIAL MUSCLES INCLUDING SAME

CROSS-REFERENCE TO RELATED APPLICATION

This application claims priority to U.S. Provisional Patent Application No. 63/117,490, filed Nov. 24, 2020, for "Electrode Pairs Having Saw-Tooth Configuration And Artificial Muscles Including Same," which is hereby incorporated by reference in its entirety including the drawings.

TECHNICAL FIELD

The present specification generally relates to apparatus and methods of actuating electrode pairs and, more specifically, apparatus and methods for utilizing electrode pairs configured to receive increased voltage inputs without shorting.

BACKGROUND

The force output of a device including an electrode pair is directly related to the amount of voltage delivered to the electrode pair. However, when the amount of voltage delivered to the electrode pair exceeds a maximum operating voltage, the electrode pair exhibits a voltage breakdown and a short occurs. Thus, the amount of voltage delivered to a device operated by an electrode pair is limited by the amount of voltage the electrode pair can receive without shorting or exhibiting a voltage breakdown. As a result, it is desirable to increase the maximum operating voltage of an electrode pair to increase the force output of the device.

Further, current robotic technologies rely on rigid components, such as servomotors to perform tasks, often in a structured environment. This rigidity presents limitations in many robotic applications, caused, at least in part, by the weight-to-power ratio of servomotors and other rigid robotics devices. The field of soft robotics improves on these limitations by using artificial muscles and other soft actuators. Artificial muscles attempt to mimic the versatility, performance, and reliability of a biological muscle. Some artificial muscles rely on fluidic actuators, but fluidic actuators require a supply of pressurized gas or liquid, and fluid transport must occur through systems of channels and tubes, limiting the speed and efficiency of the artificial muscles. Other artificial muscles use thermally activated polymer fibers, but these are difficult to control and operate at low efficiencies.

One particular artificial muscle design is described in the paper titled "*Hydraulically amplified self-healing electrostatic actuators with muscle-like performance*" by E. Acome, S. K. Mitchell, T. G. Morrissey, M. B. Emmett, C. Benjamin, M. King, M. Radakovitz, and C. Keplinger (Science 5 Jan. 2018: Vol. 359, Issue 6371, pp. 61-65). These hydraulically amplified self-healing electrostatic (HASEL) actuators use electrostatic and hydraulic forces to achieve a variety of actuation modes. However, HASEL actuator artificial muscles have a limited actuator power per unit volume.

Accordingly, a need exists for improved electrode pairs and artificial muscles including same that can receive increased voltage inputs without shorting and provide increased actuator power per unit volume.

SUMMARY

In one embodiment, an electrode pair includes a first electrode and a second electrode each having an outer surface, an inner surface, a first end, a second end, and a lead extending outwardly from the first end. The lead has a first width at the first end. The second end of at least one of the first electrode and the second electrode has a recess formed therein having a first terminus and a second terminus. A second width extends between the first terminus and the second terminus of the recess. The recess is defined by a saw-tooth pattern. The second width is greater than the first width. When the first electrode is positioned on the second electrode, the recess of the at least one first electrode and the second electrode is adjacent the lead of the other electrode.

In another embodiment, an artificial muscle includes a housing including an electrode region and an expandable fluid region, an electrode pair positioned in the electrode region of the housing, and a dielectric fluid housed within the housing. The electrode pair includes a first electrode fixed to a first surface of the housing and a second electrode fixed to a second surface of the housing. The first electrode and the second electrode each have an outer surface, an inner surface, a first end, a second end, and a lead extending outwardly from the first end. The lead has a first width at the first end. The second end of at least one of the first electrode and the second electrode has a recess formed therein having a first terminus and a second terminus. A second width extends between the first terminus and the second terminus of the recess. The recess is defined by a saw-tooth pattern. The second width is greater than the first width. At least one of the first electrode and the second electrode includes a central opening encircling the expandable fluid region. When the first electrode is positioned on the second electrode, the recess of the at least one of the first electrode and the second electrode is adjacent the lead of the other electrode. The electrode pair is actuatable between a non-actuated state and an actuated state such that actuation from the non-actuated state to the actuated state directs the dielectric fluid into the expandable fluid region.

In yet another embodiment, a method for actuating an artificial muscle includes generating a voltage using a power supply electrically coupled to an electrode pair of an artificial muscle. The artificial muscle includes a housing including an electrode region and an expandable fluid region, the electrode pair positioned in the electrode region of the housing, and a dielectric fluid housed within the housing. The electrode pair includes a first electrode fixed to a first surface of the housing and a second electrode fixed to a second surface of the housing. The first electrode and the second electrode each have an outer surface, an inner surface, a first end, a second end, and a lead extending outwardly from the first end. The lead has a first width at the first end. The second end of at least one of the first electrode and the second electrode has a recess formed therein having a first terminus and a second terminus. A second width extends between the first terminus and the second terminus of the recess. The recess defines a saw-tooth pattern. The second width being greater than the first width. The first electrode is positionable on the second electrode such that the recess of the at least one of the first electrode and the second electrode is adjacent the lead of the other electrode. At least one of the first electrode and the second electrode includes a central opening encircling the expandable fluid region. The voltage is applied to the electrode pair of the artificial muscle, thereby actuating the electrode pair from a non-actuated state to an actuated state such that the dielectric fluid is directed into the expandable fluid region of the housing and expands the expandable fluid region.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to electrode pairs, artificial muscles including the electrode pairs, artificial muscle assemblies that include a plurality of artificial muscles, and methods for using same. The electrode pairs described herein include at least a first electrode and a second electrode that are actuatable to selectively engage and disengage one another as a voltage is applied and discontinued, respectively. The first electrode and the second electrode each have an outer surface, an inner surface, a first end, a second end, and a lead extending outwardly from the first end. The lead has a first width at the first end. The second end of at least one of the first electrode and the second electrode has a recess formed therein having a first terminus and a second terminus. The recess has a second width extending between the first terminus and the second terminus. The recess is defined by a saw-tooth pattern. The second width of the recess is greater than the first width of the lead. When in an assembled state, the first electrode is positioned on the second electrode such that the recess of the at least one of the first electrode and the second electrode is adjacent the lead of the other electrode. Providing this recess adjacent an associated electrode minimizes shorts and facilitates increased operational voltage. Various embodiments of the artificial muscle and the operation of the artificial muscle are described in more detail herein. Whenever possible, the same reference numerals will be used throughout the drawings to refer to the same or like parts.

Figure 1:
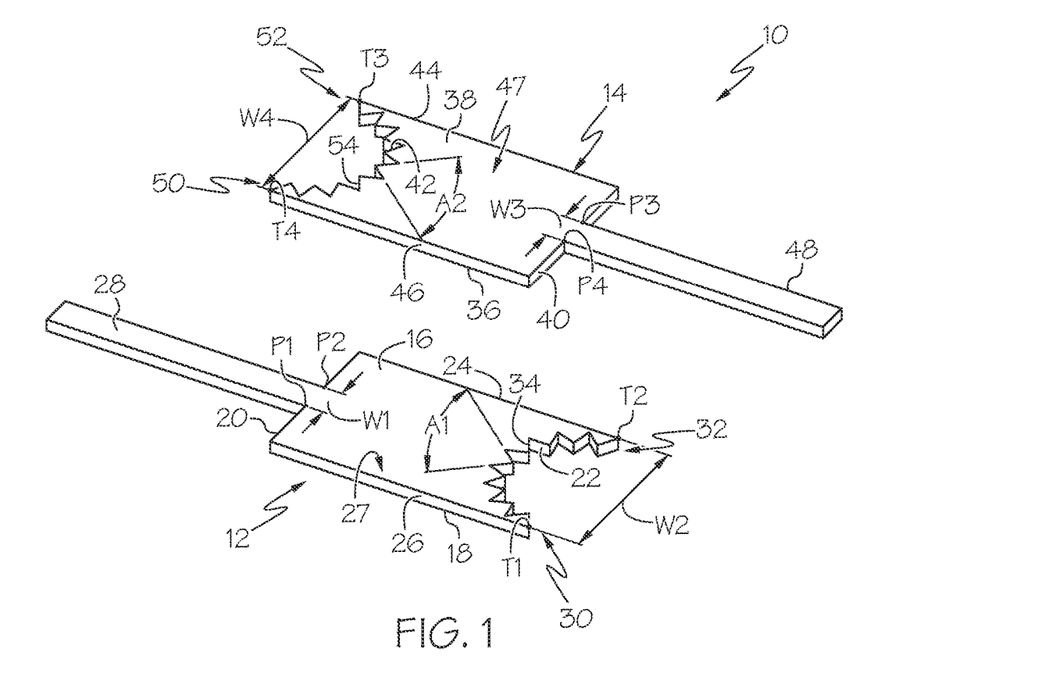
FIG. 1 schematically depicts a perspective view of an illustrative electrode pair in a disassembled state, according to one or more embodiments shown and described herein.
Figure 2:
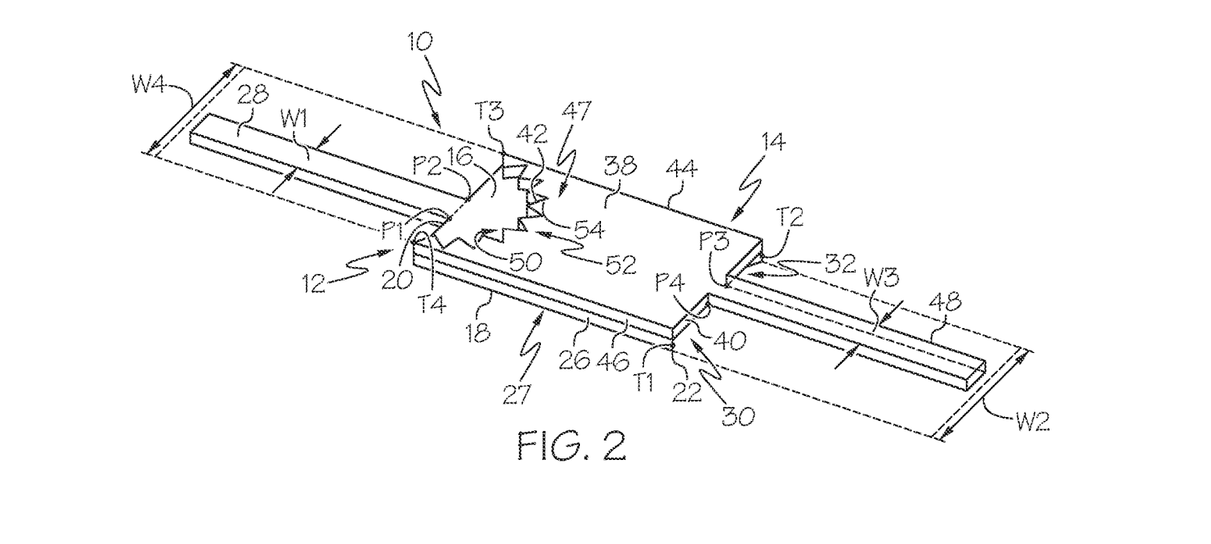
FIG. 2 schematically depicts a perspective view of the electrode pair in an assembled state, according to one or more embodiments shown and described herein.

Referring now to FIGS. 1 and 2, an electrode pair 10 is shown. The electrode pair 10 includes a first electrode 12 and a second electrode 14. It should be understood that while only the first electrode 12 and the second electrode 14 are shown for ease of illustration, the electrode pair 10 may be incorporated or used with any suitable components, such as intermediate insulating layers, a housing, electrical components, and the like, as discussed herein and illustrated in FIGS. 3-10. As such, electrode pair 10 may be utilized in any number of applications such as, for example, robotics, medical devices, tools, and may be incorporated into artificial muscles as discussed in more detail herein. In doing so, the electrode pair 12 may include any suitable support structure for allowing the first electrode 12 and the second electrode 14 to actuate relative to one another.

The first electrode 12 includes an inner surface 16, an outer surface 18, a first end 20, and an opposite second end 22. In some embodiments, the first electrode 12 includes a pair of opposite sides 24, 26 extending between the first end 20 and the second end 22 defining a body 27. As shown, the body 27 of the first electrode 12 has a rectangular geometry defined by the first end 20, the second end 22, and the pair of sides 24, 26. However, it should be appreciated that the geometry of the first electrode 12 is not limited to that illustrated herein. For example, the body 27 of the first electrode 12 may have a square geometry, a circular geometry, a star-shaped geometry, or any other suitable geometry.

The first electrode 12 includes a lead 28 extending outwardly from the first end 20 of the first electrode 12 to which a terminal is attached for delivering a charge to the first electrode 12. In some embodiments, the lead 28 extends perpendicular from the first end 20 of the first electrode 12. The lead 28 is integrally formed with the first electrode 12 such that the first electrode 12 forms a one-piece monolithic structure. The lead 28 extends from the first end 20 of the first electrode 12 at lead interfacing points P1, P2, which define a width W1 of the lead 28. The second end 22 of the first electrode 12 is deformed to provide a recess 30 extending toward the first end 20 of the first electrode 12. The recess 30 has a first terminus T1 and a second terminus T2, which define a width W2 of the recess 30. The width W2 of the recess 30 is greater than the width W1 of the lead 28. In some embodiments, the recess 30 is defined by a saw-tooth pattern 32 formed in the second end 22 of the first electrode 12 along a concave arc extending toward the first end 20 of the first electrode 12. The saw-tooth pattern 32 formed in the second end 22 of the first electrode 12 includes a plurality of teeth 34 extending between the sides 24, 26 of the first electrode 12. The number of teeth 34 is dependent on the angle A1 of each tooth 34. When the angle A1 of each tooth 34 is increased, the saw-tooth pattern 32 includes fewer teeth 34. When the angle A1 of each tooth 34 is decreased, the saw-tooth pattern 32 includes a greater number of teeth 34. In some embodiments, the angle A1 of each tooth 34 is from 20 degrees to 90 degrees. In some embodiments, the angle A1 of each tooth 34 is from 30 degrees to 60 degrees. Each tooth 34 need not have the same angle A1. As such, some teeth 34 in the saw-tooth pattern 32 may be more narrow than other teeth 34 in the saw-tooth pattern 32. However, the specific pattern formed in the second end 22 of the first electrode 12 is not limited to the saw-tooth pattern 32 illustrated herein. In some embodiments, the second end 22 of the first electrode 12 may include a curved indentation, a V-shaped indentation, or any other suitable shape formed in the second end 22 of the first electrode 12 extending toward the first end 20 thereof.

In some embodiments, the second electrode 14 is identical to the first electrode 12. As such, the second electrode 14 includes an inner surface 36, an outer surface 38, a first end 40, and an opposite second end 42. In some embodiments, the second electrode 14 includes a pair of opposite sides 44, 46 extending between the first end 40 and the second end 42 defining a body 47. As shown, the body 47 of the second electrode 14 has a rectangular geometry defined by the first end 40, the second end 42, and the pair of sides 44, 46. However, it should be appreciated that the geometry of the second electrode 14 is not limited to that illustrated herein. For example, the body 47 may have a square geometry, a circular geometry, a star-shaped geometry, or any other suitable geometry.

The second electrode 14 includes a lead 48 extending outwardly from the first end 40 of the second electrode 14 to which a terminal is attached for delivering a charge to the second electrode 14. In some embodiments, the lead 48 extends perpendicular from the first end 40 of the second electrode 14. The lead 48 is integrally formed with the second electrode 14 such that the second electrode 14 forms a one-piece monolithic structure. The lead 48 extends from the first end 40 of the second electrode 14 at lead interfacing points P3, P4, which define a width W3 of the lead 48. The second end 42 of the second electrode 14 is deformed to provide a recess 50 extending toward the first end 40 of the second electrode 14. The recess 50 has a first terminus T3 and a second terminus T4, which define a width W4 of the recess 50. The width W4 of the recess 50 is greater than the width W3 of the lead 48. In some embodiments, the recess 50 is defined by a saw-tooth pattern 52 formed in the second end 42 of the second electrode 14 along a concave arc extending toward the first end 40 of the second electrode 14. The saw-tooth pattern 52 formed in the second end 42 of the second electrode 14 includes a plurality of teeth 54 extending between the sides 44, 46 of the second electrode 14. The number of teeth 54 is dependent on the angle A2 of each tooth 54. When the angle A2 of each tooth 54 is increased, the saw-tooth pattern 52 includes fewer teeth 54. When the angle A2 of each tooth 54 is decreased, the saw-tooth pattern 52 includes a greater number of teeth 54. In some embodiments, the angle A2 of each tooth 54 is from 20 degrees to 90 degrees. In some embodiments, the angle A2 of each tooth 54 is from 30 degrees to 60 degrees. Each tooth 54 need not have the same angle A2. As such, some teeth 54 in the saw-tooth pattern 52 may be more narrow than other teeth 54 in the saw-tooth pattern 52. However, the specific pattern formed in the second end 42 of the second electrode 14 is not limited to saw-tooth pattern 52 illustrated herein. In some embodiments, the second end 42 of the second electrode 14 may include a curved indentation, a V-shaped indentation, or any other suitable shape formed in the second end 42 of the second electrode 14 extending toward the first end 40 thereof.

In some embodiments, the first electrode 12 and the second electrode 14 may not be identical. As a non-limiting example, the first electrode 12 may have a rectangular geometry and the second electrode 14 may have a circular geometry. In addition, the saw-tooth patterns 32, 52 and the leads 28, 48 are not limited to being positioned on opposite ends of each of the first electrode 12 and the second electrode 14. In some embodiments, the saw-tooth patterns 32, 52 may be formed in any other suitable side, edge, end, or other portion of the first electrode 12 and the second electrode 14 adjacent to the lead 28, 48 of the first electrode 12 and the second electrode 14. However, as discussed in more detail herein and as shown in FIGS. 1 and 2, the saw-tooth pattern 32 of the first electrode 12 is arranged over the lead 48 of the second electrode 14, and the saw-tooth pattern 52 of the second electrode 14 is arranged over the lead 28 of the first electrode 12 when in an assembled state. Although both the first electrode 12 and the second electrode 14 are depicted as having the recess 30, 50, embodiments are contemplated in which only one of the first electrode 12 and the second electrode 14 has a recess.

As shown in FIGS. 1 and 2, the first electrode 12 and the second electrode 14 each have a rectangular geometry. As shown in FIG. 1, the first electrode 12 and the second electrode 14 are spaced apart from one another in a disassembled state with the inner surface 16 of the first electrode 12 facing the inner surface 36 of the second electrode 14, and with the lead 28 of the first electrode 12 extending in an opposite direction as the lead 48 of the second electrode 14.

As shown in FIG. 2, the first electrode 12 and the second electrode 14 are in the assembled state and brought into contact with one another such that the inner surface 16 of the first electrode 12 abuts against the inner surface 36 of the second electrode 14. In this arrangement, the second end 42 of the second electrode 14 having the saw-tooth pattern 52 formed therein is adjacent the first end 20 and the lead 28 of the first electrode 12, and the second end 22 of the first electrode 12 having the saw-tooth pattern 23 formed therein is adjacent the first end 40 and the lead 48 of the second electrode 14. Specifically, the lead 28 is laterally positioned between the first terminus T3 and the second terminus T4 of the recess 50, and the lead 48 is laterally positioned between the first terminus T1 and the second terminus T2 of the recess 30.

It should be noted that, without the recess 50 formed in the second end 42 of the second electrode 14, a perpendicular intersection would be formed between the second end 42 of the second electrode 14 (shown by dashed lines) and the lead 28 of first electrode 12 at the lead interfacing points P1, P2. Similarly, without the recess 30 formed in the second end 22 of the first electrode 11, a perpendicular intersection would be formed between the second end 22 of the first electrode 12 (shown by dashed lines) and the lead 48 of second electrode 14 at the lead interfacing points P3, P4. These potential perpendicular intersections between the first electrode 12 and the second electrode 14 are susceptible to short or a voltage breakdown when receiving an excessive voltage. By providing the saw-tooth patterns 32, 52 in each of first electrode 12 and the second electrode 14, these perpendicular intersections are eliminated. As a result, the electrode pair 10 can be subjected to higher voltages without shorting or exhibiting a voltage breakdown at the leads 28 of the first electrode 12 and the lead 48 of the second electrode 14. Conventional electrodes short and exhibit a voltage breakdown at about 8 kilovolts (kV). In some embodiments, the electrode pair 10 may receive a voltage of more than 8 kV without shorting. In some embodiments, the electrode pair 10 may receive a voltage of at least 9 kV without shorting. In some embodiments, the electrode pair 10 may receive a voltage of at least 10 kV without shorting. In use, a charge is delivered to the leads 28, 48 via associated terminals and result in an attraction force attracting the first electrode 12 and the second electrode 14 to one another. When the charge is discontinued, the attraction force between the first electrode 12 and the second electrode 14 is eliminated. As discussed in more detail herein, the above disclosure of the first electrode 12 and the second electrode 14 including the saw-tooth patterns 32, 52 overlying the leads 28, 48 of the other electrode 12, 14 may be utilized in artificial muscles including to improve the amount of voltage the artificial muscle may withstand without shorting the electrode pair 10.

Figure 3:
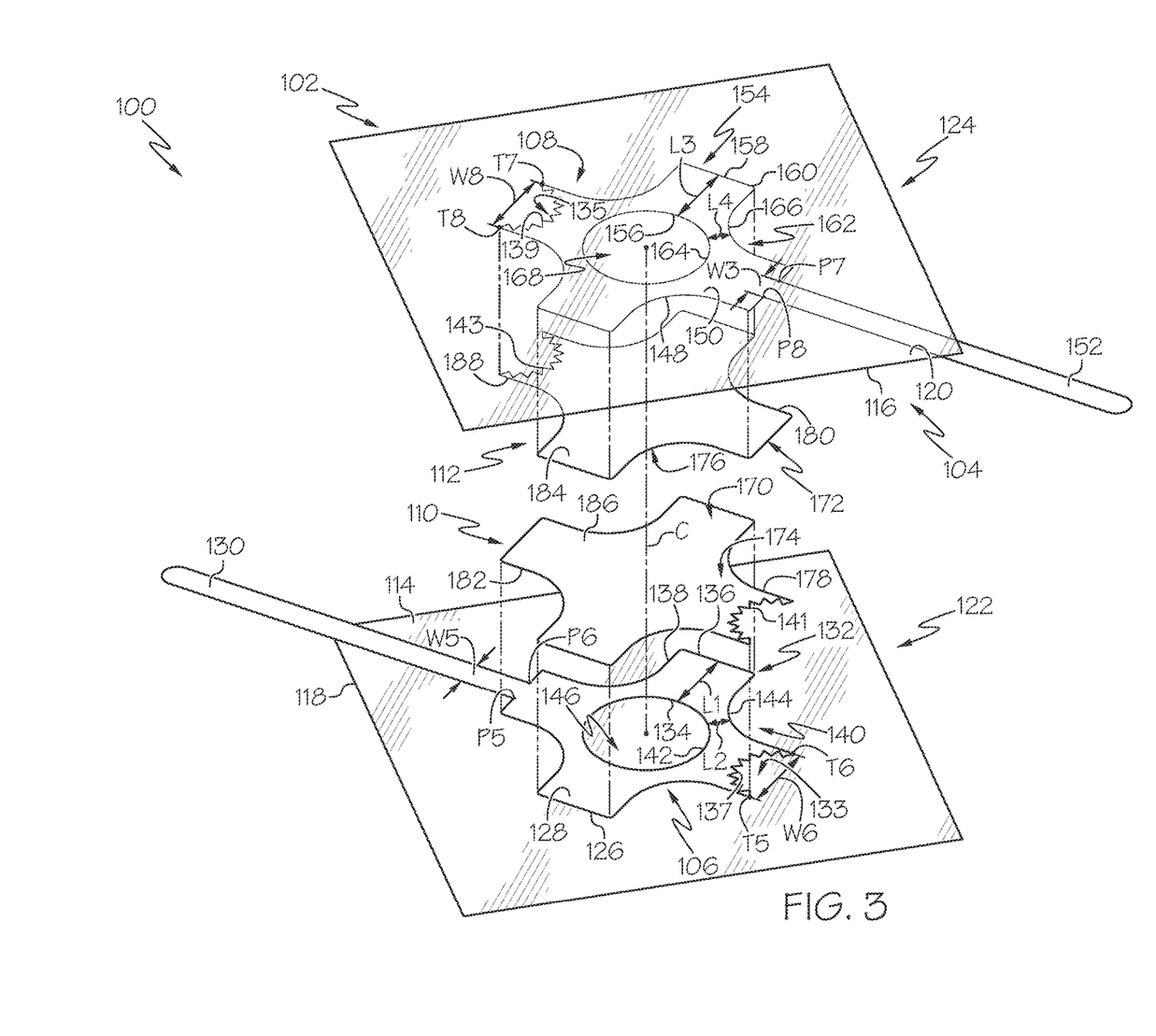
FIG. 3 schematically depicts an exploded view of an illustrative artificial muscle, according to one or more embodiments shown and described herein.
Figure 4:
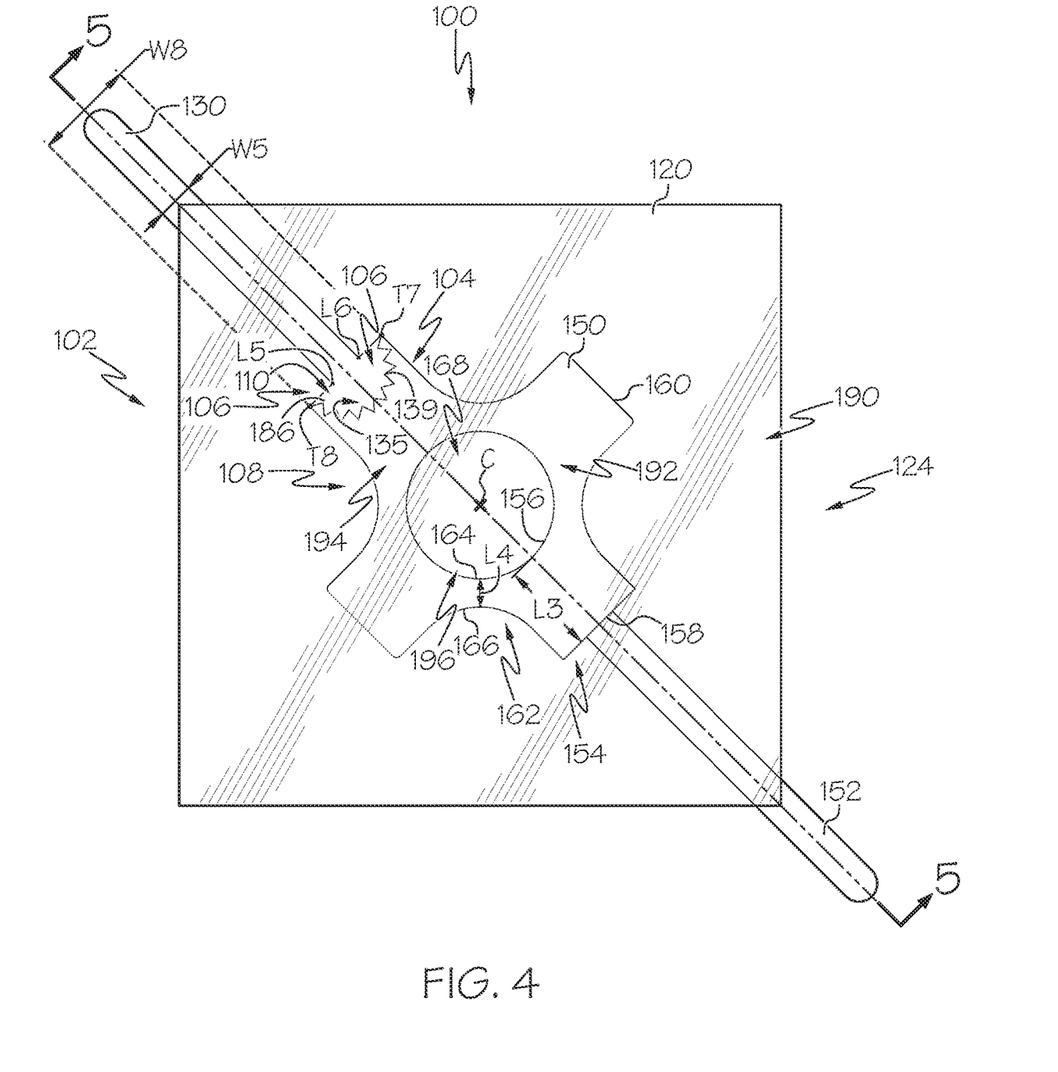
FIG. 4 schematically depicts a top view of the artificial muscle of FIG. 3, according to one or more embodiments shown and described herein.

Referring now to FIGS. 3 and 4, an artificial muscle 100 is shown. The artificial muscle 100 includes a housing 102, an electrode pair 104, including a first electrode 106 and a second electrode 108, fixed to opposite surfaces of the housing 102, a first electrical insulator layer 110 fixed to the first electrode 106, and a second electrical insulator layer 112 fixed to the second electrode 108. In some embodiments, the housing 102 is a one-piece monolithic layer including a pair of opposite inner surfaces, such as a first inner surface 114 and a second inner surface 116, and a pair of opposite outer surfaces, such as a first outer surface 118 and a second outer surface 120. In some embodiments, the first inner surface 114 and the second inner surface 116 of the housing 102 are at least partially heat-sealable. In other embodiments, the housing 102 may be a pair of individually fabricated film layers, such as a first film layer 122 and a second film layer 124. Thus, the first film layer 122 includes the first inner surface 114 and the first outer surface 118, and the second film layer 124 includes the second inner surface 116 and the second outer surface 120.

Throughout the ensuing description, reference may be made to the housing 102 including the first film layer 122 and the second film layer 124, as opposed to the one-piece housing 102. However, it should be understood that either arrangement is contemplated. In some embodiments, the first film layer 122 and the second film layer 124 generally include the same structure and composition. For example, in some embodiments, the first film layer 122 and the second film layer 124 each comprises biaxially oriented polypropylene.

The first electrode 106 and the second electrode 108 are each positioned between the first film layer 122 and the second film layer 124. In some embodiments, the first electrode 106 and the second electrode 108 are each aluminum-coated polyester such as, for example, Mylar®. In addition, one of the first electrode 106 and the second electrode 108 is a negatively charged electrode and the other of the first electrode 106 and the second electrode 108 is a positively charged electrode. For purposes discussed herein, either electrode 106, 108 may be positively charged so long as the other electrode 106, 108 of the artificial muscle 100 is negatively charged.

Figure 10:
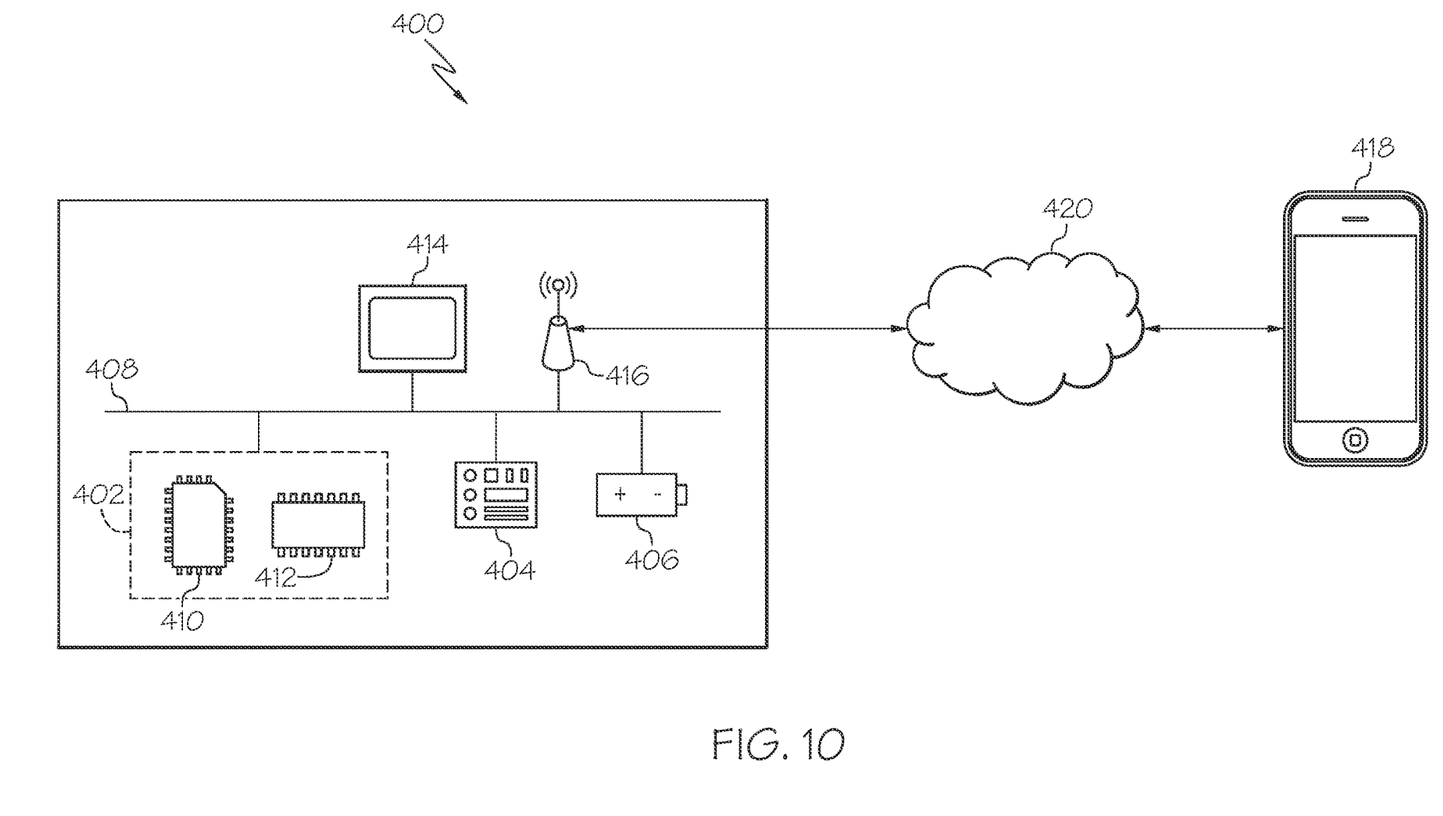
FIG. 10 schematically depicts an actuation system for operating an artificial muscle, according to one or more embodiments shown and described herein.

The first electrode 106 has a film-facing surface 126 and an opposite inner surface 128. The first electrode 106 is positioned against the first film layer 122, specifically, the first inner surface 114 of the first film layer 122. In addition, the first electrode 106 includes a first lead 130 extending from the first electrode 106 past an edge of the first film layer 122 such that the first lead 130 can be connected to a power supply to actuate the first electrode 106. Specifically, the lead 130 is coupled, either directly or in series, to a power supply and a controller of an actuation system 400, as shown in FIG. 10, via a terminal. The lead 130 extends from the first electrode 106 at lead interfacing points P5, P6, which define a width W5 of the lead 130. Similarly, the second electrode 108 has a film-facing surface 148 and an opposite inner surface 150. The second electrode 108 is positioned against the second film layer 124, specifically, the second inner surface 116 of the second film layer 124. The second electrode 108 includes a lead 152 extending from the second electrode 108 past an edge of the second film layer 124 such that the lead 152 can be connected to a power supply and a controller of the actuation system 400 via a terminal to actuate the second electrode 108. The lead 152 extends from the second electrode 108 at lead interfacing points P7, P8, which define a width W7 of the lead 152.

The first electrode 106 includes two or more tab portions 132 and two or more bridge portions 140. Each bridge portion 140 is positioned between adjacent tab portions 132, interconnecting the adjacent tab portions 132. Each tab portion 132 has a first end 134 extending radially from a center axis C of the first electrode 106 to an opposite second end 136 of the tab portion 132, where the second end 136 defines a portion of an outer perimeter 138 of the first electrode 106. Similar to the first electrode 12 of the electrode pair 10 discussed herein, at least one of the tab portions 132 of the first electrode 106 has a recess 133 formed in the second end 136 of the tab portion 132. The recess 133 has a first terminus T5 and a second terminus T6, which define a width W6 of the recess 133. The width W6 of the recess 133 is greater than the width W5 of the lead 130. In some embodiments, the recess 133 is defined by a saw-tooth pattern 137. Each bridge portion 140 has a first end 142 extending radially from the center axis C of the first electrode 106 to an opposite second end 144 of the bridge portion 140 defining another portion of the outer perimeter 138 of the first electrode 106. Each tab portion 132 has a tab length L1 and each bridge portion 140 has a bridge length L2 extending in a radial direction from the center axis C of the first electrode 106. The tab length L1 is a distance from the first end 134 to the second end 136 of the tab portion 132 and the bridge length L2 is a distance from the first end 142 to the second end 144 of the bridge portion 140. The tab length L1 of each tab portion 132 is longer than the bridge length L2 of each bridge portion 140. In some embodiments, the bridge length L2 is 20% to 50% of the tab length L1, such as 30% to 40% of the tab length L1.

In some embodiments, the two or more tab portions 132 are arranged in one or more pairs of tab portions 132. Each pair of tab portions 132 includes two tab portions 132 arranged diametrically opposed to one another. In some embodiments, the first electrode 106 may include only two tab portions 132 positioned on opposite sides or ends of the first electrode 106. In some embodiments, as shown in FIGS. 1 and 2, the first electrode 106 includes four tab portions 132 and four bridge portions 140 interconnecting adjacent tab portions 132. In this embodiment, the four tab portion 132 are arranged as two pairs of tab portions 132 diametrically opposed to one another. Furthermore, as shown, the first lead 130 extends from the second end 136 of one of the tab portions 132 and is integrally formed therewith. As shown, the first lead 130 extends from the second end 136 of a tab portion 132 opposite the tab portion 132 in which the saw-tooth pattern 137 is formed. However, as discussed herein, the saw-tooth pattern 137 may be formed in any suitable tab portion 132 such as, for example, a tab portion 132 adjacent the tab portion 132 from which the first lead 130 extends.

As with the first electrode 106, the second electrode 108 includes at least a pair of tab portions 154 and two or more bridge portions 162. Each bridge portion 162 is positioned between adjacent tab portions 154, interconnecting the adjacent tab portions 154. Each tab portion 154 has a first end 156 extending radially from a center axis C of the second electrode 108 to an opposite second end 158 of the tab portion 154, where the second end 158 defines a portion of an outer perimeter 160 of the second electrode 108. Similar to the second electrode 14 of the electrode pair 10 discussed herein, at least one of the tab portions 154 of the second electrode 108 has a recess 135 formed in the second end 158 of the tab portion 154. The recess 135 has a first terminus T7 and a second terminus T8, which define a width W8 of the recess 135. The width W8 of the recess 135 is greater than the width W7 of the lead 152. In some embodiments, the recess 135 is defined by a saw-tooth pattern 139. Although both the first electrode 106 and the second electrode 108 are depicted as having the recess 133, 135, embodiments are contemplated in which only one of the first electrode 106 and the second electrode 108 has a recess. Due to the first electrode 106 and the second electrode 108 being coaxial with one another, the center axis C of the first electrode 106 and the second electrode 108 are the same. Each bridge portion 162 has a first end 164 extending radially from the center axis C of the second electrode to an opposite second end 166 of the bridge portion 162 defining another portion of the outer perimeter 160 of the second electrode 108. Each tab portion 154 has a tab length L3 and each bridge portion 162 has a bridge length L4 extending in a radial direction from the center axis C of the second electrode 108. The tab length L3 is a distance from the first end 156 to the second end 158 of the tab portion 154 and the bridge length L4 is a distance from the first end 164 to the second end 166 of the bridge portion 162. The tab length L3 is longer than the bridge length L4 of each bridge portion 162. In some embodiments, the bridge length L4 is 20% to 50% of the tab length L3, such as 30% to 40% of the tab length L3.

In some embodiments, the two or more tab portions 154 are arranged in one or more pairs of tab portions 154. Each pair of tab portions 154 includes two tab portions 154 arranged diametrically opposed to one another. In some embodiments, the second electrode 108 may include only two tab portions 154 positioned on opposite sides or ends of the first electrode 106. In some embodiments, as shown in FIGS. 1 and 2, the second electrode 108 includes four tab portions 154 and four bridge portions 162 interconnecting adjacent tab portions 154. In this embodiment, the four tab portions 154 are arranged as two pairs of tab portions 154 diametrically opposed to one another. Furthermore, as shown, the second lead 152 extends from the second end 158 of one of the tab portions 154 and is integrally formed therewith. As shown, the second lead 152 extends from the second end 158 of a tab portion 154 opposite the tab portion 154 in which the saw-tooth pattern 139 is formed. However, as discussed herein, the saw-tooth pattern 139 may be formed in any suitable tab portion 154 such as, for example, a tab portion 154 adjacent the tab portion 154 from which the second lead 152 extends.

Figure 5:
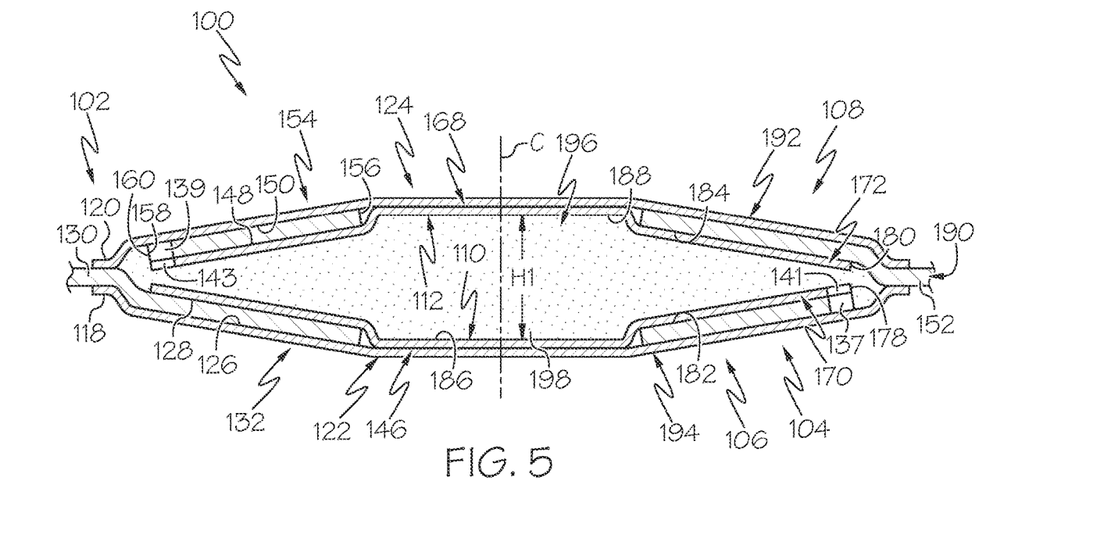
FIG. 5 schematically depicts a cross-sectional view of the artificial muscle of FIG. 3 taken along line 5-5 in FIG. 4 in a non-actuated state, according to one or more embodiments shown and described herein.
Figure 6:
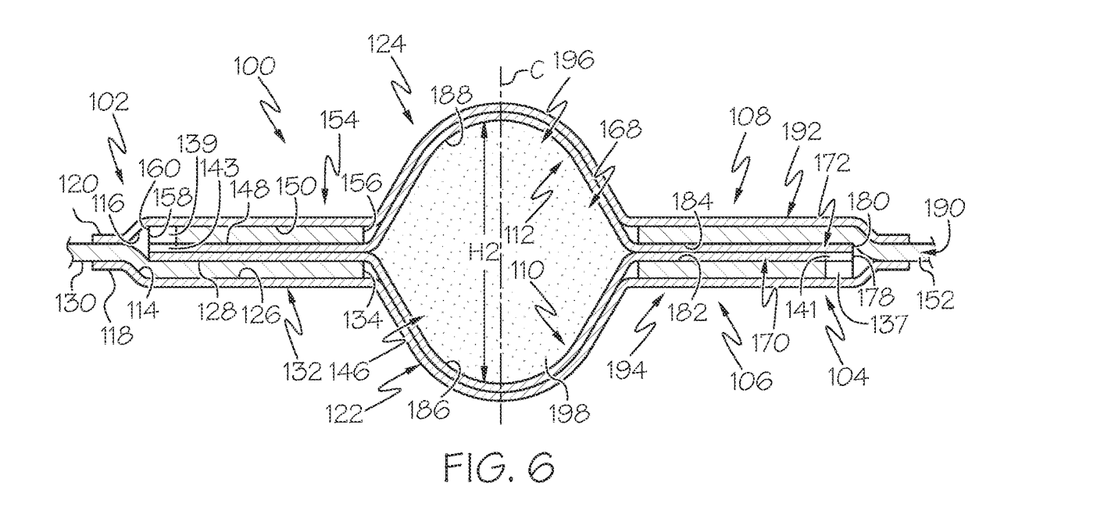
FIG. 6 schematically depicts a cross-sectional view of the artificial muscle of FIG. 3 in an actuated state, according to one or more embodiments shown and described herein.

Referring now to FIGS. 3-8, at least one of the first electrode 106 and the second electrode 108 has a central opening. In FIGS. 3 and 4, the first electrode 106 has a central opening 146 formed therein between the first end 134 of the tab portions 132 and the first end 142 of the bridge portions 140, and the second electrode 108 has a central opening 168 formed therein between the first end 156 of the tab portions 154 and the first end 164 of the bridge portions 162. However, it should be understood that the first electrode 106 does not need to include the central opening 146 when the central opening 168 is also provided within the second electrode 108, as shown in FIGS. 5 and 6. Alternatively, the second electrode 108 does not need to include the central opening 168 when the central opening 146 is also provided within the first electrode 106.

Referring still to FIGS. 2-8, the first electrical insulator layer 110 and the second electrical insulator layer 112 have a geometry generally corresponding to the first electrode 106 and the second electrode 108, respectively. Thus, the first electrical insulator layer 110 and the second electrical insulator layer 112 each have tab portions 170, 172 and bridge portions 174, 176 corresponding to like portions on the first electrode 106 and the second electrode 108. Further, the first electrical insulator layer 110 and the second electrical insulator layer 112 each have an outer perimeter 178, 180 corresponding to the outer perimeter 138 of the first electrode 106 and the outer perimeter 160 of the second electrode 108, respectively, when positioned thereon. Because the first electrical insulator layer 110 has a geometry corresponding to the first electrode 106, a recess defined by a saw-tooth pattern 141 is formed in the outer perimeter 178 of one of the tab portions 170 of the first electrical insulator layer 110 corresponding to the saw-tooth pattern 137 formed in the first electrode 106. Similarly, because the second electrical insulator layer 112 has a geometry corresponding to the second electrode 108, a recess defined by a saw-tooth pattern 143 is formed in the outer perimeter 180 of one of the tab portions 172 of the second electrical insulator layer 112 corresponding to the saw-tooth pattern 139 formed in the second electrode 108. The structure and features of saw-tooth patterns 32, 52 of the electrode pair 10 as described herein is equally applicable to each of the saw-tooth patterns 137, 139, 141, 143 of the artificial muscle 100.

It should be appreciated that, in some embodiments, the first electrical insulator layer 110 and the second electrical insulator layer 112 generally include the same structure and composition. As such, in some embodiments, the first electrical insulator layer 110 and the second electrical insulator layer 112 each include an adhesive surface 182, 184 and an opposite non-sealable surface 186, 188, respectively. Thus, in some embodiments, the first electrical insulator layer 110 and the second electrical insulator layer 112 are each a polymer tape adhered to the inner surface 128 of the first electrode 106 and the inner surface 150 of the second electrode 108, respectively.

Referring now to FIGS. 4-8, the artificial muscle 100 is shown in an assembled state with the first lead 130 of the first electrode 106 and the second lead 152 of the second electrode 108 extending past an outer perimeter of the housing 102, i.e., the first film layer 122 and the second film layer 124. As shown in FIG. 4, the second electrode 108 is stacked on top of the first electrode 106 and, therefore, the first electrode 106 and the second electrical insulating layer 112 are not shown. Only a portion of the first electrical insulating layer 110 is shown proximate the first lead 130 extending from the first electrode 106. In addition, the first lead 130 is laterally positioned between the first terminus T7 and the second terminus T8 of the recess 135 of the second electrode 108. Similarly, although not shown, the second lead 152 is laterally positioned between the first terminus T5 and the second terminus T6 of the recess 133 of the first electrode 108. In the assembled state, the first electrode 106, the second electrode 108, the first electrical insulator layer 110, and the second electrical insulator layer 112 are sandwiched between the first film layer 122 and the second film layer 124. The first film layer 122 is partially sealed to the second film layer 124 at an area surrounding the outer perimeter 138 of the first electrode 106 and the outer perimeter 160 of the second electrode 108. In some embodiments, the first film layer 122 is partially sealed to the second film layer 124. Specifically, in some embodiments, the first film layer 122 is sealed to the second film layer 124 to define a sealed portion 190 surrounding the first electrode 106 and the second electrode 108. The first film layer 122 and the second film layer 124 may be sealed in any suitable manner, such as using an adhesive, heat sealing, or the like.

The first electrode 106, the second electrode 108, the first electrical insulator layer 110, and the second electrical insulator layer 112 provide a barrier that prevents the first film layer 122 from completely sealing to the second film layer 124, thereby forming an unsealed portion 192. The unsealed portion 192 of the housing 102 includes an electrode region 194, in which the electrode pair 104 is provided, and an expandable fluid region 196, which is surrounded by the electrode region 194. The central openings 146, 168 of the first electrode 106 and the second electrode 108 form the expandable fluid region 196 and are arranged to be axially stacked on one another and define the expandable fluid region 196. Although not shown, the housing 102 may be cut to conform to the geometry of the electrode pair 104 and reduce the size of the artificial muscle 100, namely, the size of the sealed portion 190.

A dielectric fluid 198 is provided within the unsealed portion 192 and flows freely between the first electrode 106 and the second electrode 108. A "dielectric" fluid as used herein is a medium or material that transmits electrical force without conduction and as such has low electrical conductivity. Some non-limiting example dielectric fluids include perfluoroalkanes, transformer oils, and deionized water. It should be appreciated that the dielectric fluid 198 may be injected into the unsealed portion 192 of the artificial muscle 100 using a needle or other suitable injection device.

Referring now to FIGS. 5 and 6, the artificial muscle 100 is actuatable between a non-actuated state and an actuated state. In the non-actuated state, as shown in FIG. 5, the first electrode 106 and the second electrode 108 are partially spaced apart from one another proximate the central openings 146, 168 thereof and the first end 134, 156 of the tab portions 132, 154. The second end 136, 158 of the tab portions 132, 154 remain in position relative to one another due to the housing 102 being sealed at the outer perimeter 138 of the first electrode 106 and the outer perimeter 160 of the second electrode 108. As such, the saw-tooth pattern 137 of the first electrode 106 and the saw-tooth pattern 141 of the first electrical insulator layer 112 are provided adjacent the outer perimeter 160 of the second electrode 108 and the second lead 152. Similarly, the saw-tooth pattern 139 of the second electrode 108 and the saw-tooth pattern 143 of the second electrical insulator layer 112 are provided adjacent the outer perimeter 138 of the first electrode 106 and the first lead 130. In the actuated state, as shown in FIG. 6, the first electrode 106 and the second electrode 108 are brought into contact with and oriented parallel to one another to force the dielectric fluid 198 into the expandable fluid region 196. This causes the dielectric fluid 198 to flow through the central openings 146, 168 of the first electrode 106 and the second electrode 108 and inflate the expandable fluid region 196.

Referring now to FIG. 5, the artificial muscle 100 is shown in the non-actuated state. The electrode pair 104 is provided within the electrode region 194 of the unsealed portion 192 of the housing 102. The central opening 146 of the first electrode 106 and the central opening 168 of the second electrode 108 are coaxially aligned within the expandable fluid region 196. In the non-actuated state, the first electrode 106 and the second electrode 108 are partially spaced apart from and non-parallel to one another. Due to the first film layer 122 being sealed to the second film layer 124 around the electrode pair 104, the second end 136, 158 of the tab portions 132, 154 are brought into contact with one another. Thus, dielectric fluid 198 is provided between the first electrode 106 and the second electrode 108, thereby separating the first end 134, 156 of the tab portions 132, 154 proximate the expandable fluid region 196. Stated another way, a distance between the first end 134 of the tab portion 132 of the first electrode 106 and the first end 156 of the tab portion 154 of the second electrode 108 is greater than a distance between the second end 136 of the tab portion 132 of the first electrode 106 and the second end 158 of the tab portion 154 of the second electrode 108. This results in the electrode pair 104 zippering toward the expandable fluid region 196 when actuated. In some embodiments, the first electrode 106 and the second electrode 108 may be flexible. Thus, as shown in FIG. 5, the first electrode 106 and the second electrode 108 are convex relative to one another such that the second ends 136, 158 of the tab portions 132, 154 thereof may remain close to one another, but spaced apart from one another proximate the central openings 146, 168. In the non-actuated state, the expandable fluid region 196 has a first height H1.

When actuated, as shown in FIG. 6, the first electrode 106 and the second electrode 108 zipper toward one another from the second ends 144, 158 of the tab portions 132, 154 thereof, thereby pushing the dielectric fluid 198 into the expandable fluid region 196. As shown, when in the actuated state, the first electrode 106 and the second electrode 108 are parallel to one another. In the actuated state, the dielectric fluid 198 flows into the expandable fluid region 196 to inflate the expandable fluid region 196. As such, the first film layer 122 and the second film layer 124 expand in opposite directions. In the actuated state, the expandable fluid region 196 has a second height H2, which is greater than the first height H1 of the expandable fluid region 196 when in the non-actuated state. Although not shown, it should be noted that the electrode pair 104 may be partially actuated to a position between the non-actuated state and the actuated state. This would allow for partial inflation of the expandable fluid region 196 and adjustments when necessary.

In order to move the first electrode 106 and the second electrode 108 toward one another, a voltage is applied by a power supply. In some embodiments, a voltage of up to 10 kV may be provided from the power supply to induce an electric field through the dielectric fluid 198. The resulting attraction between the first electrode 106 and the second electrode 108 pushes the dielectric fluid 198 into the expandable fluid region 196. Pressure from the dielectric fluid 198 within the expandable fluid region 196 causes the first film layer 122 and the first electrical insulator layer 110 to deform in a first axial direction along the center axis C of the first electrode 106 and causes the second film layer 124 and the second electrical insulator layer 112 to deform in an opposite second axial direction along the center axis C of the second electrode 108. Once the voltage being supplied to the first electrode 106 and the second electrode 108 is discontinued, the first electrode 106 and the second electrode 108 return to their initial, non-parallel position in the non-actuated state.

It should be appreciated that the present embodiments disclosed herein, specifically, the tab portions 132, 154 having the saw-tooth patterns 137, 139 formed therein, provide a number of improvements over actuators, such as HASEL actuators, that do not include the tab portions 132, 154 having the saw-tooth patterns 137, 139. Embodiments of the artificial muscle 100 including two pairs of tab portions 132, 154 on each of the first electrode 106 and the second electrode 108, respectively, reduces the overall mass and thickness of the artificial muscle 100, reduces the amount of voltage required during actuation, and decreases the total volume of the artificial muscle 100 without reducing the amount of resulting force after actuation as compared to known HASEL actuators including donut-shaped electrodes having a uniform, radially-extending width. More particularly, the tab portions 132, 154 of the artificial muscle 100 provide zipping fronts that result in increased actuation power by providing localized and uniform hydraulic actuation of the artificial muscle 100 compared to HASEL actuators including donut-shaped electrodes. Specifically, one pair of tab portions 132, 154 provides twice the amount of actuator power per unit volume as compared to donut-shaped HASEL actuators, while two pairs of tab portions 132, 154 provide four times the amount of actuator power per unit volume. The bridge portions 174, 176 interconnecting the tab portions 132, 154 also limit buckling of the tab portions 132, 154 by maintaining the distance between adjacent tab portions 132, 154 during actuation. Because the bridge portions 174, 176 are integrally formed with the tab portions 132, 154, the bridge portions 174, 176 also prevent leakage between the tab portions 132, 154 by eliminating attachment locations that provide an increased risk of rupturing. Additionally, as discussed herein, the saw-tooth patterns 137, 139 eliminate perpendicular intersection points between the tab portions 132, 154 and the leads 130, 152. This allows for the artificial muscle 100 to be able to receive higher voltages with a reduced risk of shorting and voltage breakdowns.

In operation, when the artificial muscle 100 is actuated, expansion of the expandable fluid region 196 produces a force of, for example, 3 Newton-millimeters (N·mm) per cubic centimeter (cm3) of actuator volume or greater, 4 N·mm per cm3 of actuator volume or greater, 5 N·mm per cm3 of actuator volume or greater, 6 N·mm per cm3 of actuator volume or greater, 7 N·mm per cm3 of actuator volume or greater, 8 N·mm per cm3 of actuator volume or greater, 9 N·mm per cm3 of actuator volume or greater, 10 N·mm per cm3 of actuator volume or greater, 11 N·mm per cm3 of actuator volume or greater, and 12 N·mm per cm3 of actuator volume or greater. In one example, when the artificial muscle 100 is actuated by a voltage of 9.5 kilovolts (kV), the artificial muscle 100 provides a resulting force of 5 N. In another example, when the artificial muscle 100 is actuated by a voltage of 10 kV the artificial muscle 100 provides 440% strain under a 500 gram load.

Moreover, the size of the first electrode 106 and the second electrode 108 is proportional to the amount of displacement of the dielectric fluid 198. Therefore, when greater displacement within the expandable fluid region 196 is desired, the size of the electrode pair 104 is increased relative to the size of the expandable fluid region 196. It should be appreciated that the size of the expandable fluid region 196 is defined by the central openings 146, 168 in the first electrode 106 and the second electrode 108. Thus, the degree of displacement within the expandable fluid region 196 may alternatively, or in addition, be controlled by increasing or reducing the size of the central openings 146, 168.

Figure 7:
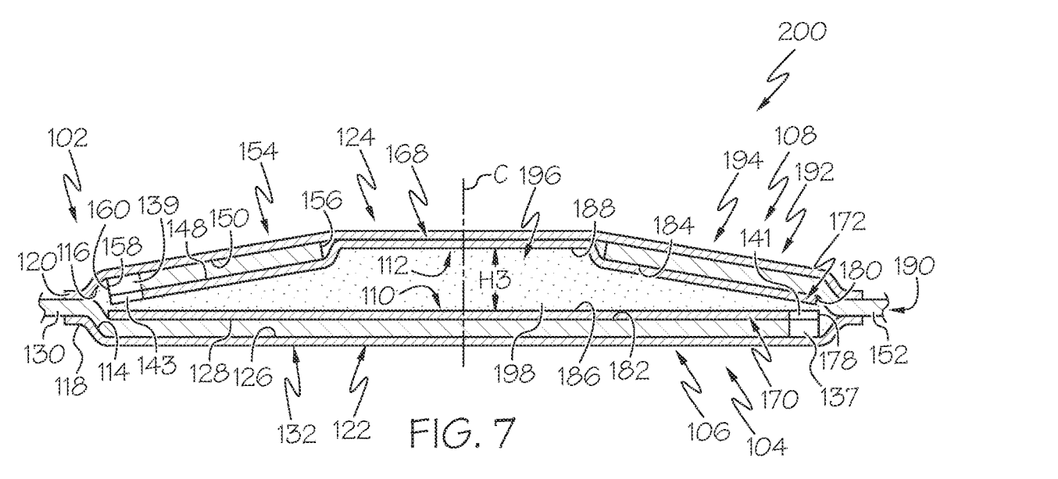
FIG. 7 schematically depicts a cross-sectional view of an illustrative artificial muscle in a non-actuated state, according to one or more embodiments shown and described herein.
Figure 8:
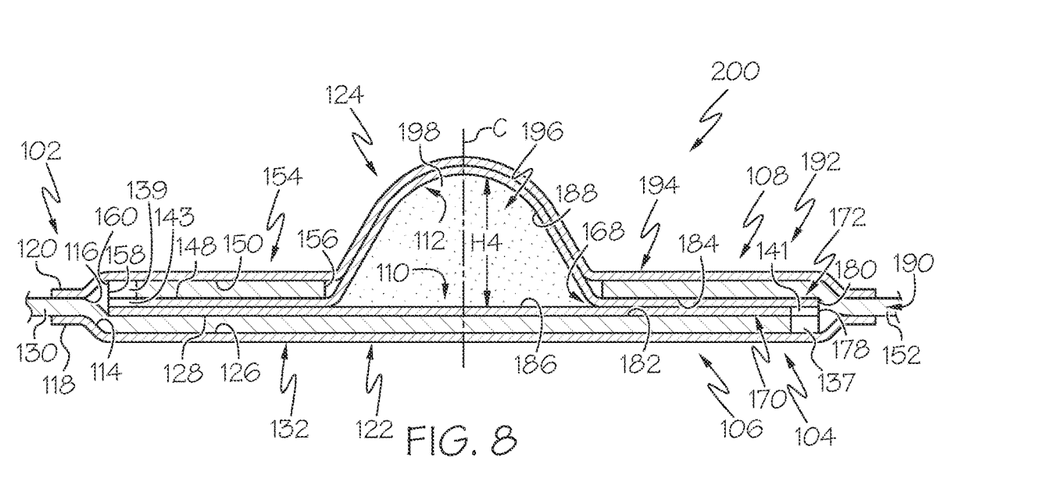
FIG. 8 schematically depicts a cross-sectional view of the artificial muscle of FIG. 7 in an actuated state, according to one or more embodiments shown and described herein.

As shown in FIGS. 7 and 8, another embodiment of an artificial muscle 200 is illustrated. The artificial muscle 200 is substantially similar to the artificial muscle 100. As such, like structure is indicated with like reference numerals. However, as shown, the first electrode 106 does not include the central opening 146. Thus, only the second electrode 108 includes the central opening 168 formed therein. As shown in FIG. 7, the artificial muscle 200 is in the non-actuated state with the first electrode 106 being planar and the second electrode 108 being convex relative to the first electrode 106. In the non-actuated state, the expandable fluid region 196 has a first height H3. In the actuated state, as shown in FIG. 8, the expandable fluid region 196 has a second height H4, which is greater than the first height H3. It should be appreciated that by providing the central opening 168 only in the second electrode 108 as opposed to both the first electrode 106 and the second electrode 108, the total deformation may be formed on one side of the artificial muscle 200. In addition, because the total deformation is formed on only one side of the artificial muscle 200, the second height H4 of the expandable fluid region 196 of the artificial muscle 200 extends further from a longitudinal axis perpendicular to the central axis C of the artificial muscle 200 than the second height H2 of the expandable fluid region 196 of the artificial muscle 100 when all other dimensions, orientations, and volume of dielectric fluid are the same.

Figure 9:
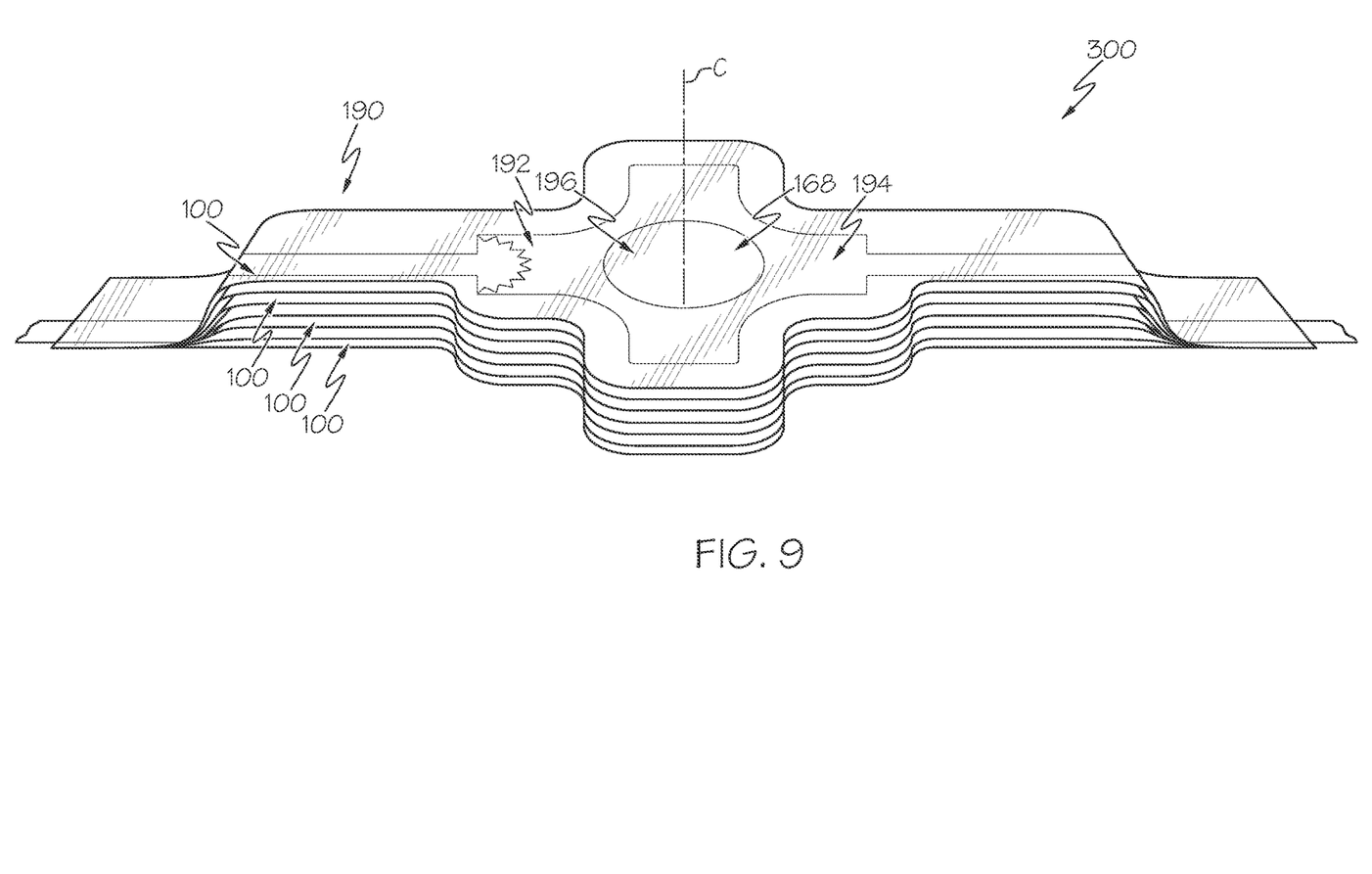
FIG. 9 schematically depicts a perspective view of an artificial muscle assembly including a plurality of the artificial muscles of FIG. 3, according to one or more embodiments shown and described herein.

Referring now to FIG. 9, an artificial muscle assembly 300 is shown including a plurality of artificial muscles, such as the artificial muscle 100. However, it should be appreciated that a plurality of artificial muscles 200 may similarly be arranged in a stacked formation. Each artificial muscle 100 may be identical in structure and arranged in a stack such that the expandable fluid region 196 of each artificial muscle 100 overlies the expandable fluid region 196 of an adjacent artificial muscle 100. The leads 130, 152 of each artificial muscle 100 are electrically connected to one another such that the artificial muscles 100 may be simultaneously actuated between the non-actuated state and the actuated state. By arranging the artificial muscles 100 in a stacked configuration, the total deformation of the artificial muscle assembly 300 is the sum of the deformation within the expandable fluid region 196 of each artificial muscle 100. As such, the resulting degree of deformation from the artificial muscle assembly 300 is greater than that which would be provided by the artificial muscle 100 alone.

Referring now to FIG. 10, an actuation system 400 may be provided for operating an electrode pair, an artificial muscle, or an artificial muscle assembly, such as the electrode pair 10, the artificial muscles 100, 200, or the artificial muscle assembly 300 between the non-actuated state and the actuated state. Thus, the actuation system 400 may include a controller 402, an operating device 404, a power supply 406, and a communication path 408. The various components of the actuation system 400 will now be described.

The controller 402 includes a processor 410 and a non-transitory electronic memory 412 to which various components are communicatively coupled. In some embodiments, the processor 410 and the non-transitory electronic memory 412 and/or the other components are included within a single device. In other embodiments, the processor 410 and the non-transitory electronic memory 412 and/or the other components may be distributed among multiple devices that are communicatively coupled. The controller 402 includes non-transitory electronic memory 412 that stores a set of machine-readable instructions. The processor 410 executes the machine-readable instructions stored in the non-transitory electronic memory 412. The non-transitory electronic memory 412 may comprise RAM, ROM, flash memories, hard drives, or any device capable of storing machine-readable instructions such that the machine-readable instructions can be accessed by the processor 410. Accordingly, the actuation system 400 described herein may be implemented in any conventional computer programming language, as pre-programmed hardware elements, or as a combination of hardware and software components. The non-transitory electronic memory 412 may be implemented as one memory module or a plurality of memory modules.

In some embodiments, the non-transitory electronic memory 412 includes instructions for executing the functions of the actuation system 400. The instructions may include instructions for operating the electrode pair 10, the artificial muscles 100, 200, or the artificial muscle assembly 300 based on a user command.

The processor 410 may be any device capable of executing machine-readable instructions. For example, the processor 410 may be an integrated circuit, a microchip, a computer, or any other computing device. The non-transitory electronic memory 412 and the processor 410 are coupled to the communication path 408 that provides signal interconnectivity between various components and/or modules of the actuation system 400. Accordingly, the communication path 408 may communicatively couple any number of processors with one another, and allow the modules coupled to the communication path 408 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 10, the communication path 408 communicatively couples the processor 410 and the non-transitory electronic memory 412 of the controller 402 with a plurality of other components of the actuation system 400. For example, the actuation system 400 depicted in FIG. 10 includes the processor 410 and the non-transitory electronic memory 412 communicatively coupled with the operating device 404 and the power supply 406.

The operating device 404 allows for a user to control operation of the electrode pair 10, the artificial muscles 100, 200, or the artificial muscle assembly 300. In some embodiments, the operating device 404 may be a switch, toggle, button, or any combination of controls to provide user operation. As a non-limiting example, a user may actuate the electrode pair 10, the artificial muscles 100, 200, or the artificial muscle assembly 300 into the actuated state by activating controls of the operating device 404 to a first position. While in the first position, the electrode pair 10, the artificial muscles 100, 200, or the artificial muscle assembly 300 will remain in the actuated state. The user may switch the electrode pair 10, the artificial muscles 100, 200, or the artificial muscle assembly 300 into the non-actuated state by operating the controls of the operating device 404 out of the first position and into a second position.

The operating device 404 is coupled to the communication path 408 such that the communication path 408 communicatively couples the operating device 404 to other modules of the actuation system 400. The operating device 404 may provide a user interface for receiving user instructions as to a specific operating configuration of the electrode pair 10, the artificial muscles 100, 200, or the artificial muscle assembly 300. In addition, user instructions may include instructions to operate the electrode pair 10, the artificial muscles 100, 200, or the artificial muscle assembly 300 only at certain conditions.

The power supply 406 (e.g., battery) provides power to the electrode pair 10, the artificial muscles 100, 200, or the artificial muscle assembly 300. In some embodiments, the power supply 406 is a rechargeable direct current power source. It is to be understood that the power supply 406 may be a single power supply or battery for providing power to the electrode pair 10, the artificial muscles 100, 200, or the artificial muscle assembly 300. A power adapter (not shown) may be provided and electrically coupled via a wiring harness or the like for providing power to the electrode pair 10, the artificial muscles 100, 200, or the artificial muscle assembly 300 via the power supply 406.

In some embodiments, the actuation system 400 also includes a display device 414. The display device 414 is coupled to the communication path 408 such that the communication path 408 communicatively couples the display device 414 to other modules of the actuation system 400. The display device 414 may output a notification in response to an actuation state of the electrode pair 10, the artificial muscles 100, 200, or the artificial muscle assembly 300 or indication of a change in the actuation state of the electrode pair 10, the artificial muscles 100, 200, or the artificial muscle assembly 300. Moreover, the display device 414 may be a touchscreen that, in addition to providing optical information, detects the presence and location of a tactile input upon a surface of or adjacent to the display device 414. Accordingly, the display device 414 may include the operating device 404 and receive mechanical input directly upon the optical output provided by the display device 414.

In some embodiments, the actuation system 400 includes network interface hardware 416 for communicatively coupling the actuation system 400 to a portable device 418 via a network 420. The portable device 418 may include, without limitation, a smartphone, a tablet, a personal media player, or any other electric device that includes wireless communication functionality. It is to be appreciated that, when provided, the portable device 418 may serve to provide user commands to the controller 402, instead of the operating device 404. As such, a user may be able to control or set a program for controlling the electrode pair 10, the artificial muscles 100, 200, or the artificial muscle assembly 300 without utilizing the controls of the operating device 404. Thus, the electrode pair 10, the artificial muscles 100, 200, or the artificial muscle assembly 300 may be controlled remotely via the portable device 418 wirelessly communicating with the controller 402 via the network 420.

From the above, it is to be appreciated that defined herein is an artificial muscle for inflating or deforming a surface of an object by selectively actuating the artificial muscle to raise and lower a region thereof. This provides a low profile inflation member that may operate on demand.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An electrode pair comprising:
   a first electrode and a second electrode each having an outer surface, an inner surface, a first end, a second end, and a lead extending outwardly from the first end, the lead having a first width at the first end, the second end of at least one of the first electrode and the second electrode each having a recess formed therein having a first terminus and a second terminus, a second width extending between the first terminus and the second terminus of the recess, the recess defined by a saw-tooth pattern, the second width being greater than the first width, wherein when the first electrode is positioned on the second electrode, the recess of the at least one of the first electrode and the second electrode is adjacent the lead of the other electrode.

2. The electrode pair of claim 1, wherein the first electrode and the second electrode each have a recess formed in the second end thereof, and when the first electrode is positioned on the second electrode, the lead of the first electrode is laterally positioned between the first terminus and the second terminus of the recess of the second electrode, and the lead of the second electrode is laterally positioned between the first terminus and the second terminus of the recess of the first electrode.

3. The electrode pair of claim 1, wherein the first electrode and the second electrode each have a body defined by the first end, the second end, a first side, and an opposite second side, the first side and the second side extending between the first end and the second end, the lead extending perpendicular from the body.

4. The electrode pair of claim 3, wherein the body of the first electrode and the second electrode is rectangular such that the first end of the first electrode and the second electrode is opposite the second end of the first electrode and the second electrode, respectively.

5. The electrode pair of claim 1, wherein the saw-tooth pattern of the recess comprises a plurality of teeth.

6. The electrode pair of claim 5, wherein an angle between adjacent teeth of the saw-tooth pattern is from 10 degrees to 100 degrees.

7. The electrode pair of claim 6, wherein the angle between adjacent teeth of the saw-tooth pattern is from 30 degrees to 60 degrees.

8. The electrode pair of claim 1, wherein the saw-tooth pattern extends along a concave arc.

9. An artificial muscle comprising:
a housing comprising an electrode region and an expandable fluid region;
an electrode pair positioned in the electrode region of the housing, the electrode pair comprising a first electrode fixed to a first surface of the housing and a second electrode fixed to a second surface of the housing, wherein:
the first electrode and the second electrode each have an outer surface, an inner surface, a first end, a second end, and a lead extending outwardly from the first end, the lead having a first width at the first end, the second of the at least one of the first electrode and the second electrode having a recess formed therein having a first terminus and a second terminus, a second width extending between the first terminus and the second terminus of the recess, the recess defined by a saw-tooth pattern, the second width being greater than the first width,
at least one of the first electrode and the second electrode comprises a central opening encircling the expandable fluid region; and
a dielectric fluid housed within the housing, wherein when the first electrode is positioned on the second electrode, the recess of the at least one of the first electrode and the second electrode is adjacent the lead of the other electrode, wherein the electrode pair is actuatable between a non-actuated state and an actuated state such that actuation from the non-actuated state to the actuated state directs the dielectric fluid into the expandable fluid region.

10. The artificial muscle of claim 9, wherein the first electrode and the second electrode each comprise at least two tab portions and at least two bridge portions, the at least two tab portions defined by the first end and the second end, each of the at least two bridge portions interconnects adjacent tab portions.

11. The artificial muscle of claim 10, wherein the saw-tooth pattern is formed in a first tab portion of the at least two tab portions of each of the first electrode and the second electrode, wherein the lead extends perpendicular from a second tab portion of the at least two tab portions of each of the first electrode and the second electrode, the first tab portion being opposite the second tab portion.

12. The artificial muscle of claim 9, wherein the saw-tooth pattern comprises a plurality of teeth.

13. The artificial muscle of claim 12, wherein an angle between adjacent teeth of the saw-tooth pattern is from 30 degrees to 60 degrees.

14. The artificial muscle of claim 9, wherein the saw-tooth pattern extends along a concave arc.

15. The artificial muscle of claim 9, wherein:
when the electrode pair is in the non-actuated state, the first electrode and the second electrode are non-parallel to one another; and
when the electrode pair is in the actuated state, the first electrode and the second electrode are parallel to one another, such that the first electrode and the second electrode are configured to zipper toward one another and toward the central opening when actuated from the non-actuated state to the actuated state.

16. A method for actuating an artificial muscle, the method comprising:
generating a voltage using a power supply electrically coupled to an electrode pair of an artificial muscle, the artificial muscle comprising:
a housing with an electrode region and an expandable fluid region;
the electrode pair positioned in the electrode region of the housing, the electrode pair comprising a first electrode fixed to a first surface of the housing and a second electrode fixed to a second surface of the housing, wherein:
the first electrode and the second electrode each have an outer surface, an inner surface, a first end, a second end, and a lead extending outwardly from the first end, the lead having a first width at the first end, the second end of at least one of the first electrode and the second electrode having a recess formed therein having a first terminus and a second terminus, a second width extending between the first terminus and the second terminus of the recess, the recess defined by a saw-tooth pattern, the second width being greater than the first width, the first electrode positionable on the second electrode such that the recess of the at least one of the first electrode and the second electrode is adjacent the lead of the other electrode, at least one of the first electrode and the second electrode comprises a central opening encircling the expandable fluid region; and a dielectric fluid housed within the housing; and applying the voltage to the electrode pair of the artificial muscle, thereby actuating the electrode pair from a non-actuated state to an actuated state such that the dielectric fluid is directed into the expandable fluid region of the housing and expands the expandable fluid region.

17. The method of claim 16, wherein the housing comprises a first film layer and a second film layer, and partially heat sealing the first film layer and the second to one another to define a sealed portion of the housing, the housing further comprising an unsealed portion surrounded by the sealed portion, wherein the electrode region and the expandable fluid region of the housing are disposed in the unsealed portion.

18. The method of claim 16, wherein a controller is communicatively coupled to the electrode pair, and the controller directing the voltage from the power supply across the first electrode and the second electrode to actuate the artificial muscle from the non-actuated state to the actuated state.

19. The method of claim 16, wherein the saw-tooth pattern comprises a plurality of teeth extending along a concave arc, an angle between adjacent teeth of the saw-tooth pattern is from 30 degrees to 60 degrees.

20. The method of claim 16, wherein the voltage applied to the artificial muscle is greater than 9 kV.

\* \* \* \* \*